United States Patent [19]
Davis

[11] Patent Number: 5,954,623
[45] Date of Patent: Sep. 21, 1999

[54] TOOL CHANGER APPARATUS AND METHOD OF AUTOMATING A MACHINE TOOL

[76] Inventor: Steven E. Davis, 217 Westbury, Florence, Ala. 35630

[21] Appl. No.: 08/946,144

[22] Filed: Oct. 7, 1997

[51] Int. Cl.⁶ .................................................. B23Q 3/157
[52] U.S. Cl. .............................. 483/35; 483/34; 483/55; 483/69
[58] Field of Search .................... 483/34, 35, 33, 483/55, 66, 56, 59, 54, 43; 279/900

[56] References Cited

U.S. PATENT DOCUMENTS

| | | | |
|---|---|---|---|
| 3,451,125 | 6/1969 | Lehmkuhl | 483/34 |
| 3,637,058 | 1/1972 | Sato et al. | 409/80 |
| 3,683,490 | 8/1972 | Chabrier | 483/61 X |
| 3,893,371 | 7/1975 | Frazier | 409/233 |
| 3,953,039 | 4/1976 | Hauge et al. | 483/34 |
| 3,962,777 | 6/1976 | Stoilov | 483/34 X |
| 3,999,769 | 12/1976 | Bayer et al. | 279/900 X |
| 4,356,609 | 11/1982 | Wollerman | 409/231 X |
| 4,400,995 | 8/1983 | Palm | 408/241 R |
| 4,499,650 | 2/1985 | Cannon | 483/54 X |
| 4,761,877 | 8/1988 | Rupp | 483/59 X |
| 4,860,429 | 8/1989 | von Haas | 483/43 |
| 5,263,918 | 11/1993 | Ruetschle | 483/34 |
| 5,300,006 | 4/1994 | Tanaka et al. | 483/56 |
| 5,423,643 | 6/1995 | Suzuki et al. | 409/232 |
| 5,672,145 | 9/1997 | Pollington et al. | 483/59 |

FOREIGN PATENT DOCUMENTS

| | | | |
|---|---|---|---|
| 273834 | 7/1988 | European Pat. Off. | 483/69 |
| 140548 | 3/1980 | Germany | 483/35 |
| 132940 | 8/1982 | Japan | 483/34 |
| 362193712 | 8/1987 | Japan | 483/34 |
| 647709 | 2/1985 | Switzerland | 483/56 |
| 156142 | 9/1992 | Ukraine | 483/56 |
| 2124110 | 2/1984 | United Kingdom | 483/59 |

*Primary Examiner*—William Briggs
*Attorney, Agent, or Firm*—John J. Elnitski, Jr.

[57] ABSTRACT

The present invention provides a tool changer which can be placed on the table of an existing machine tool, while utilizing the existing control computer of the machine tool to automate the tool changing process. This simplified tool changer allows the owner of an entry level machine tool to automate the machine tool at a relatively low cost and without many modifications to the machine tool as compared to current alternatives. The tool changer of the present invention requires no external power, no additional motors, and no modifications to the spindle of the machine tool.

10 Claims, 8 Drawing Sheets

TOOL CHANGER APPARATUS AND METHOD OF AUTOMATING A MACHINE TOOL

BACKGROUND

The present invention relates to machine tools in general, and more specifically to an apparatus and method for holding and exchanging tools used in machining during the operation of a machine tool.

It is well know that there are computer controlled machine tools which use automatic tool changers to speed the machining process by allowing the changing of tools while machining a product. Automatic tool changers allow the tools to be changed without the delay of the machine waiting for the operator to manually change the tool. Current automatic tool changers are often complex, having motorized rotary tool carousels and/or motorized changing arms which grasp and transfer tools. These current tool changers require extra motors and/or powered actuators to rotate their storage carousels, transfer tools.

With today's computer control technology, entry level machine tools are available that have tremendous sophistication and capabilities to do machining work. More companies are entering the computerized machining control market due to the economical cost of these entry level machine tools. Generally these entry level machines do not have automatic tool changers, thereby requiring the machine tool to stop and wait for an operator to change a tool. As a company grows, the need arises for an advanced automated machine to speed the machining process and reduce operator involvement. Many small companies find the new fully automated machine tools to be cost prohibitive, even though the purchase could help the companies grow. An alternative to purchasing an automated machine tool is to add a tool changer to their entry level machine tool in order to automate. As mentioned above, most of the current tool changers are complex which often makes it impractical to add a tool changer to an entry level machine tool. There have been some attempts at less complex tool changers, but these did not seem to fit the owner's needs of the entry level machines due to cost and required modifications to the machine tool.

It is an object of the present invention to provide a tool changer that is easily added to an existing machine tool with minimum modifications to the machine tool. It is another object of the present invention to provide a method of orienting a machine tool spindle for use with a tool changer without adding electrical sensors.

SUMMARY OF THE INVENTION

The present invention is a tool changer and a method of orienting a spindle of a machine tool. The tool changer includes a tool rack extending above a table of a machine tool. The tool rack is supported from the table by a base with at least one support between the base and tool rack. There is at least one tool station for receiving a tool, where the tool station is attached as part of the tool rack. The tool station includes a tool station base, at least two bolts extending from the tool station base, a bottom plate slidably attached to the two bolts, and two fingers that are slidably and rotatably attached to said two bolts and that are positioned above the bottom plate. There is at least one vertical spring attached between the tool station base and the bottom plate. There is also at least one horizontal spring attached between the two fingers at a rear end of each of the two fingers. Finally, there is at least one spindle orientation unit attached as part of the tool rack and a chip cover unit.

The method of orienting a spindle involves orienting notches on a machine tool spindle to receive a tool when using a tool changer. This is accomplished by knowing the three dimensional positions of the tool, the tool changer, the spindle and a spring loaded plunger. The plunger is moved toward the spindle so that the plunger contacts the spindle in a region of the spindle notches and so that the spindle pushes backward the spring loaded plunger. Then the spindle is rotated until the plunger extends into one of the notches of the spindle and stops rotation of the spindle.

DETAILED DESCRIPTION

The present invention provides a tool changer which can be placed on the table of an existing machine tool, while utilizing the existing control computer of the machine tool to automate the tool changing process. This simplified tool changer allows the owner of an entry level machine tool to automate the machine tool at a relatively low cost and without many modifications to the machine tool as compared to current alternatives. The tool changer of the present invention requires no external power, no additional motors, and no modifications to the spindle of the machine tool.

Figure 1:
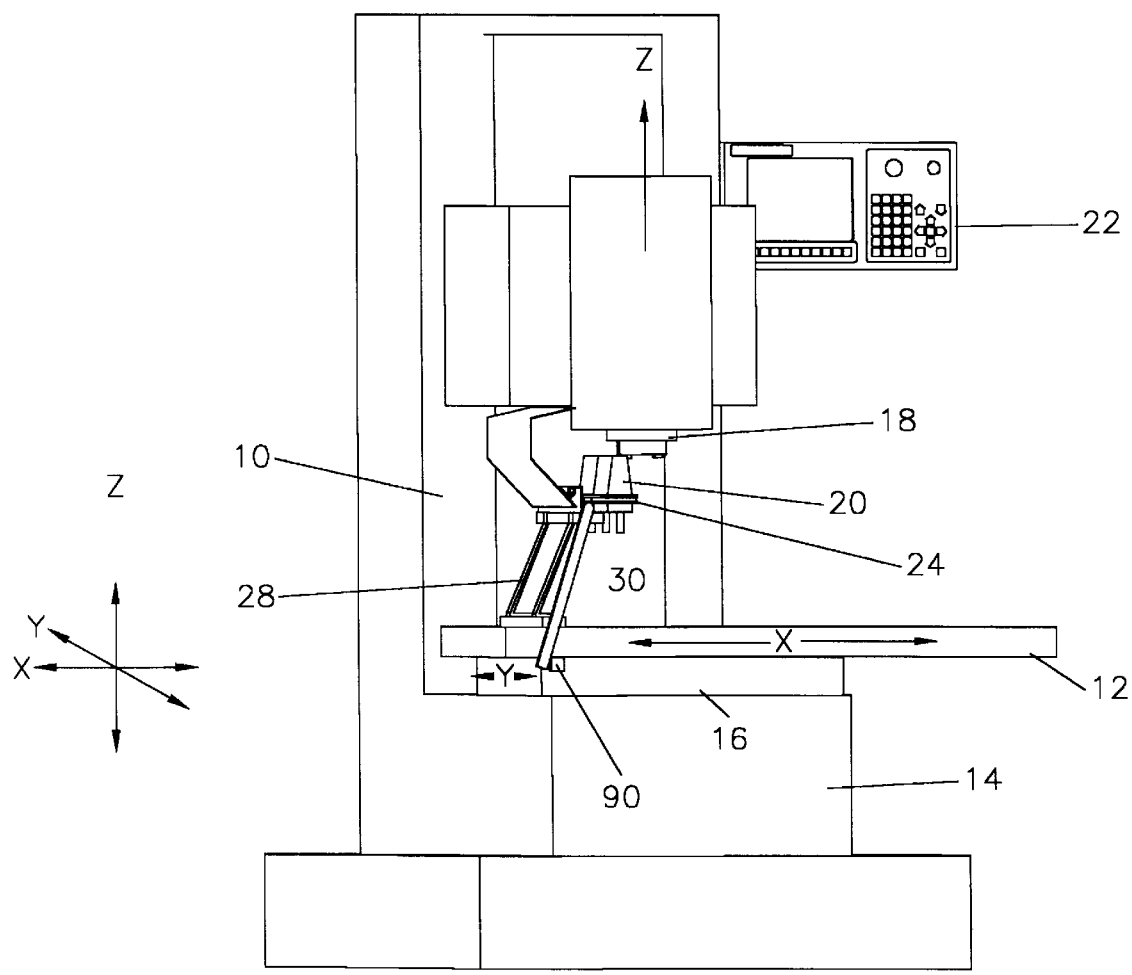
FIG. 1 is a perspective view of a machine tool with a tool changer according to the present invention.

FIG. 1 shows the tool changer 10 according to the present invention mounted to a table 12 of a machine tool 14. The table 12 moves in the X direction while mounted on a table base 16 which moves the Y direction. A spindle 18 moves in the Z direction and is designed to accept a tool 20. A control computer 22 interconnected to the machine tool 14 controls the movement of the table 12 and the spindle 18. As shown in FIG. 1, the tool changer 10 is usually mounted to one end of the table 12. Optionally, the tool changer 10 may be mounted anywhere on the table 12 and there may be more than one tool changer 10 mounted to the table 12. FIGS. 2–6 show closer views of the tool changer 10. The tool changer 10 includes a tool rack 24, spindle orientation unit 26, supports 28, changer base 30 and chip cover unit 32. The changer base 30 mounts to the table 12 of the machine tool 14 using the standard available mounting procedure for the table. The mounting of the changer base 30 will depend on the particular table 12 used, where the changer base 30 is designed to mount to that particular table 12. Typically, T slots and bolts (not shown) are the combination used for mounting accessories to a machine tool table. The supports 28 are attached between the changer base 30 and the tool rack 24, thereby supporting the tool rack 24 above the table 12. This allows space for the tools 20 to extend downward without hitting the table 12.

Figure 5:
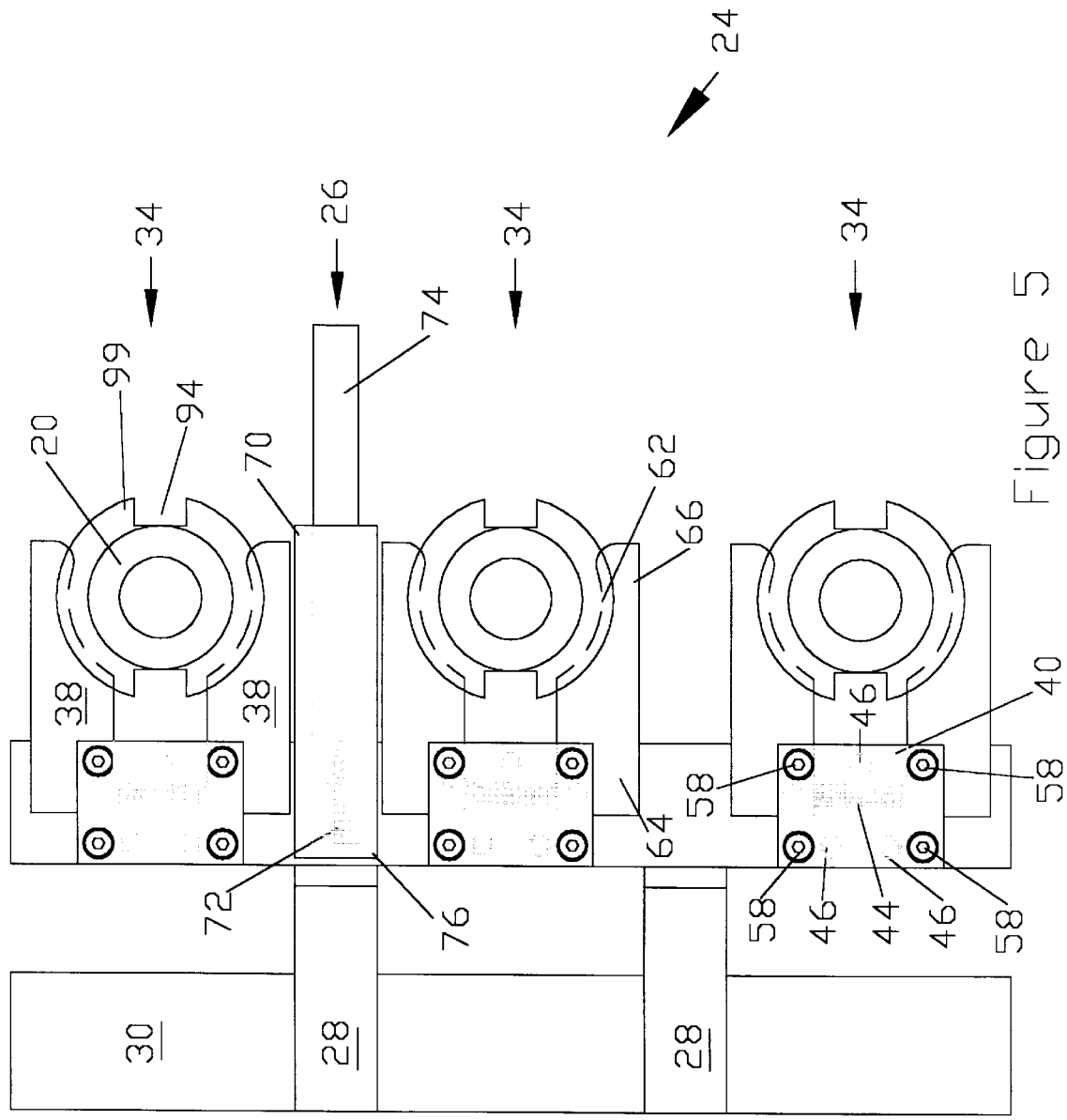
FIG. 5 is a top view of the tool rack according to the present invention.
Figure 6:
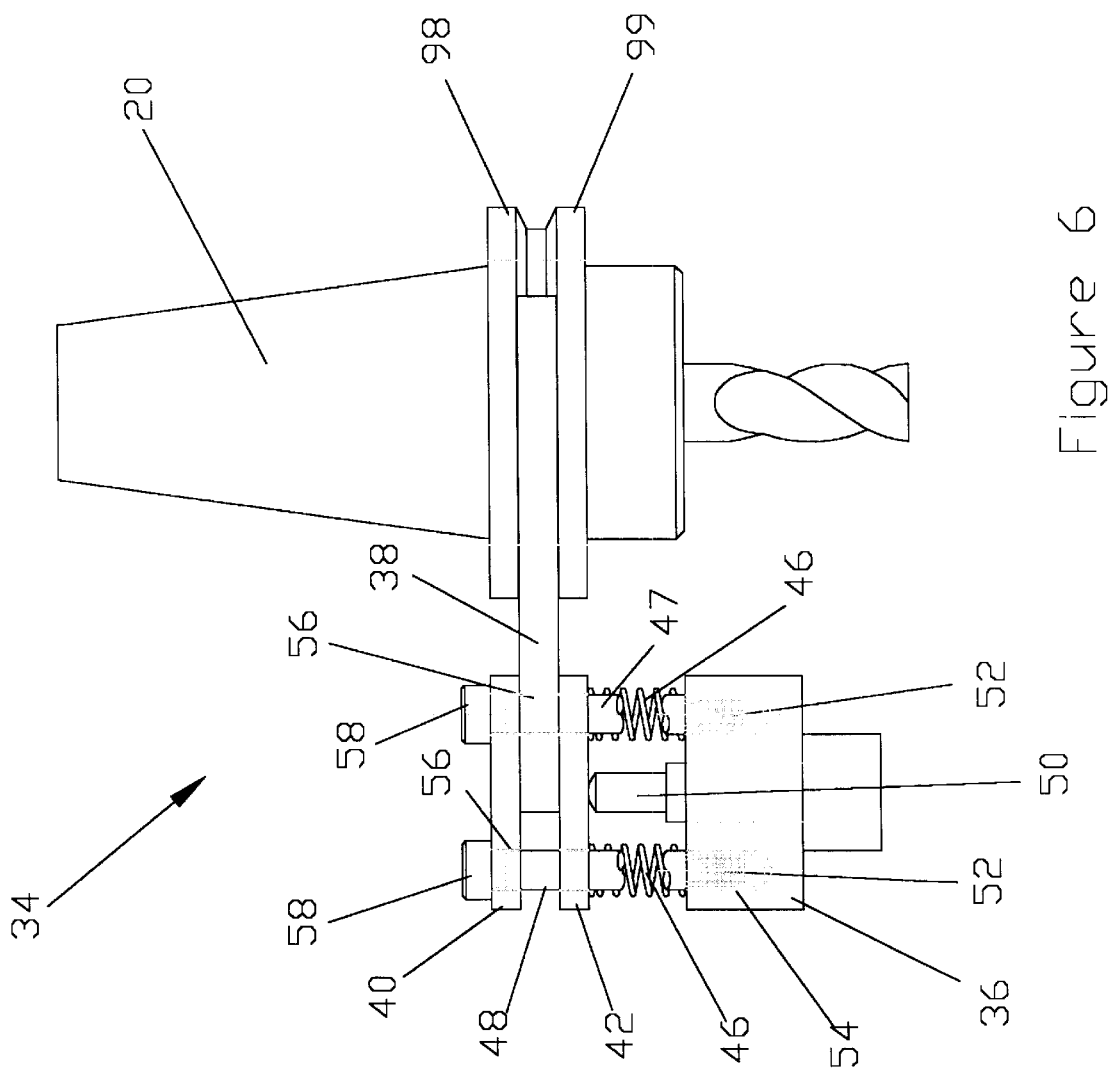
FIG. 6 is a side view of the tool rack shown in FIG. 5.

The tool rack 24 in FIGS. 5 and 6 is shown with three tool stations 34 mounted a tool station base 36. Though the tool rack 24 is shown with three tool stations 34, it could have more or less than three such stations 34. Each tool station 34 includes two moveable fingers 38, top and bottom sandwich plates 40, 42, horizontal spring 44, three vertical springs 46, four bolts 48 and an optional switch 50. Each of the four bolts 48 has a threaded section 52 which fastens into holes 54 on the tool station base 36. The bolts 48 must first be inserted through holes 56 in the two sandwich plates 40, 42 and the fingers 38. The bolts 48 have bolt heads 58 which restrict the movement of the sandwich plates 40, 42 upward beyond the top of the bolts 48. The body 47 of the bolts 48 act as a guide so that the sandwich plates 40, 42 and the fingers 38 can slide up and down between the tool station base 36 and the bolt heads 58. The two fingers 38 of each station 34 rotate between the two sandwich plates 40, 42 at a pivot point which is about the front set of bolts 48. Each finger 38 of the station 34 has a semi-circular shaped side 62. The fingers 38 are mounted between the sandwich plates 40, 42 so that the semi-circular shaped sides 62 face each other. The semi-circular sides 62 are used to hold the tool 20, which is usually round. The horizontal spring 44 is a compressive spring mounted between the rear ends 64 of the fingers 38. The horizontal spring 44 functions to force the front ends 66 of the fingers 38 toward each other in order to hold the tool 20. The three vertical springs 46 are compressive and are mounted between the tool station base 36 and the bottom sandwich plate 42. The vertical springs 46 force the sandwich plates 40, 42 along with the fingers 38 upward against the bolt heads 58. Alternatively (not shown), vertical springs could be mounted about the body 47 of the bolts 48. The optional switch 50 is mounted to the tool station base 36 so that it is under and extends upward toward the bottom sandwich plate 42.

The spindle orientation unit 26 is mounted on the tool station base 36 and includes a plunger housing 70, a plunger spring 72, plunger 74 and a means (not shown) to retain the plunger 74 from exiting the housing 70. The plunger spring 72 is a compressive spring located between the rear wall 76 of the housing 70 and the rear end 78 of the plunger 74. There are several means known in the art for retaining the plunger 74 from exiting the housing 70 and therefore it is not necessary to specify this means.

The chip cover unit 32 includes a cover 82, cover hinge 84, cover arm 86, cover linkage 88 and an activation dog 90. The cover hinge 84 acts as a pivot point for the cover 82 and is attached between the tool station base 36 and the cover 82. The cover linkage 88 links the cover 82 to the cover arm 86. The cover arm 86 is pivotally attached at the changer base 30 and the activation dog 90 is attached to the table base 16 of the machine tool 14. The cover arm 86 must be long enough to engage the activation dog 90.

The method of using the above mentioned components of the tool changer 10 along with the machine tool 14 and the control computer 22 will now be discussed. All movements of the table 12 and the spindle 18 are under the control of the machine tool control computer 22 and its programming. The tool changer 10 is moved into position near the spindle 18 by movement of the table 12 in the X and Y directions. The spindle 18 moves up and down in the Z direction.

Figure 7:
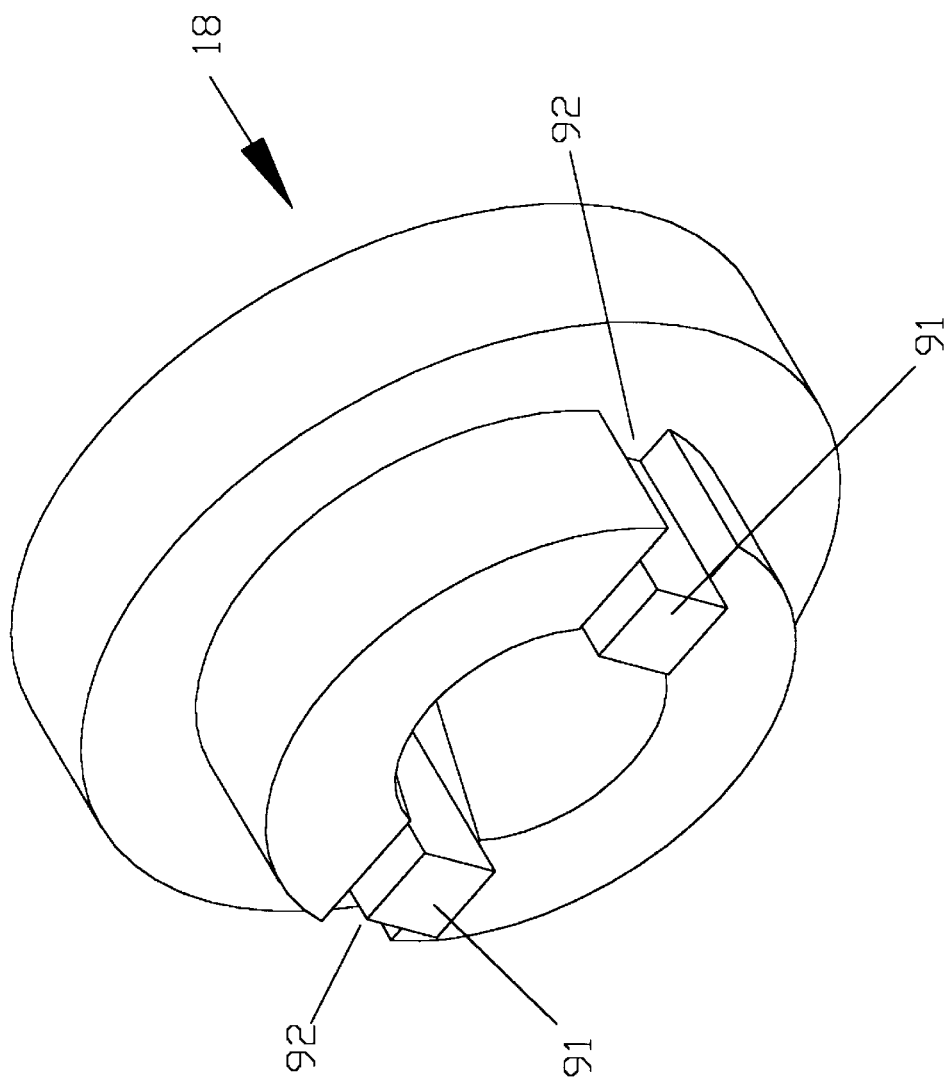
FIG. 7 is a perspective view of the spindle shown in FIGS. 1, 3 and 4.
Figure 8:
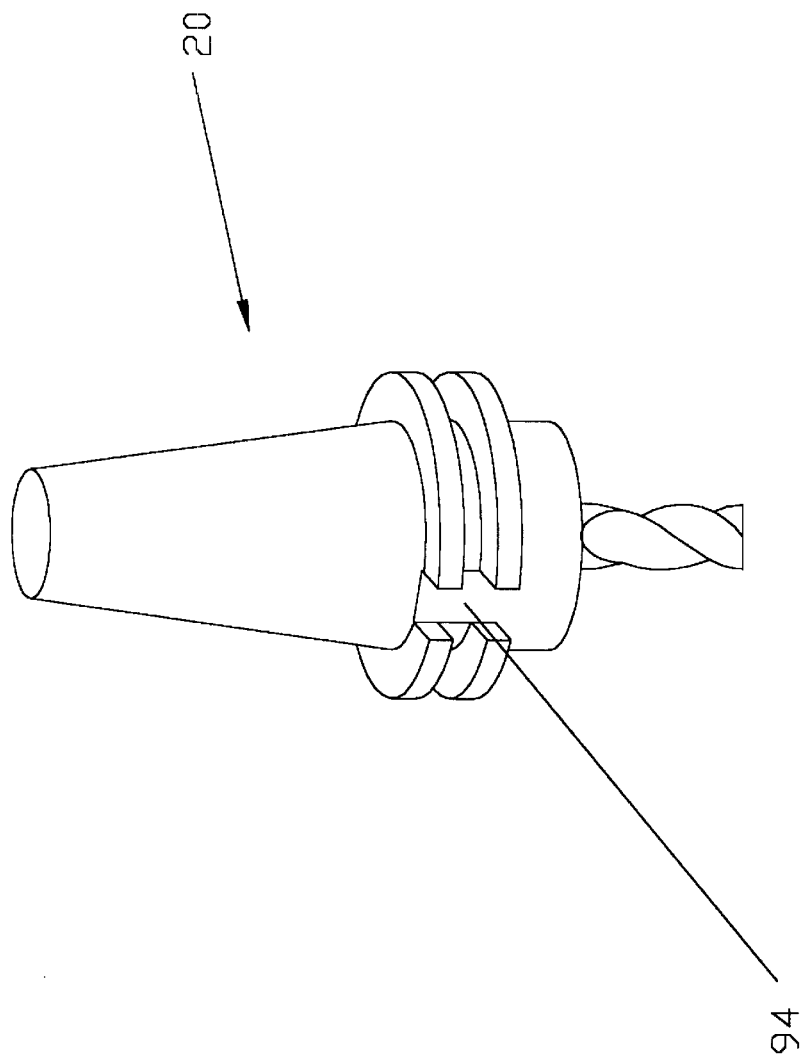
FIG. 8 is a perspective view of the tool shown in FIGS. 1–6.

An example of most tools 20 and spindles 18 are as shown in FIGS. 7 and 8. The spindle 18 is hollow to accept the cone shaped top of the tool 20. The spindle 18 has spindle dogs 91 which fit into tool notches 94 of the tool 20 when the tool 20 and spindle 18 are engaged. As can be seen in FIG. 7, the spindle 18 also has spindle notches 92 on the outside of the spindle 18 which are aligned with the spindle dogs 91. Other examples (not shown) of the tool and spindle combination are reversed, where the spindle has notches and the tool has dogs that fit in the notches of the spindle. In either case the spindle will have notches that will be utilized as explained further in this discussion.

Figure 3:
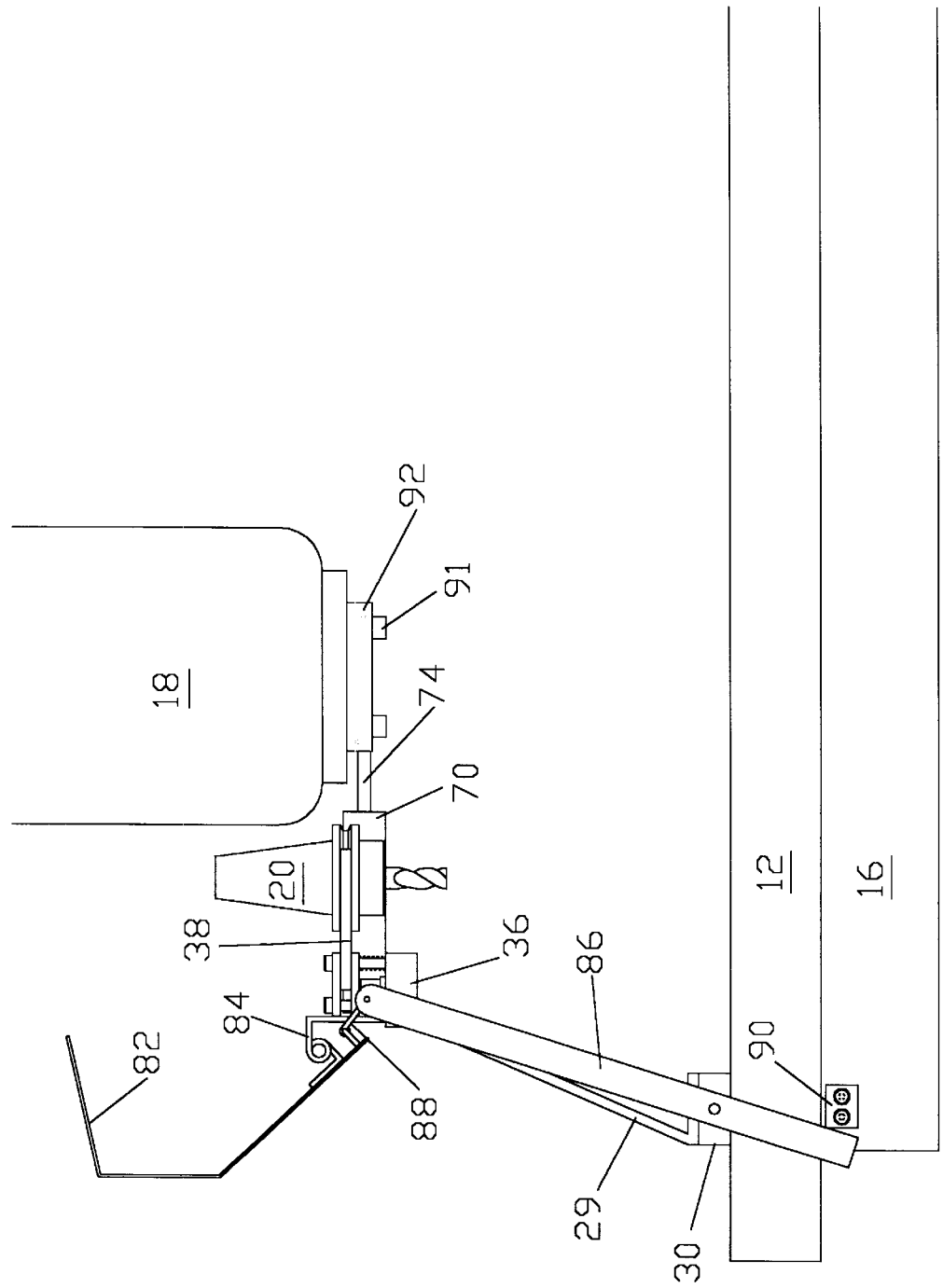
FIG. 3. is a side view of the tool changer of FIG. 1 with the chip cover in an opened position.
Figure 4:
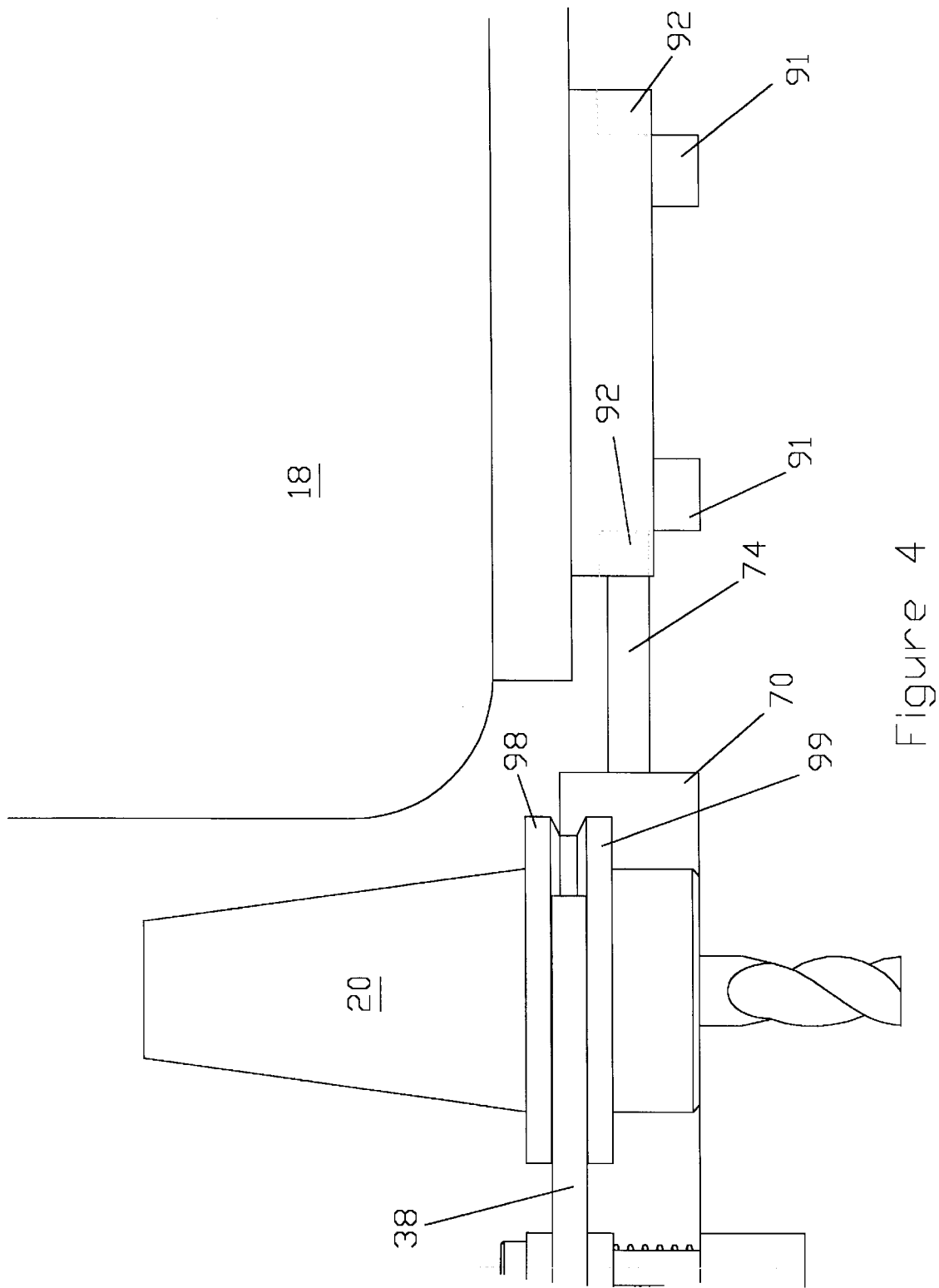
FIG. 4 is a closer side view of the plunger and the spindle shown in FIG. 3.

The X, Y and Z position of the tool stations 34, spindle orientation unit 26 and the spindle 18 is always known by the control computer 22. Unknown to the control computer 22 is the rotational position of spindle notches 92. The spindle orientation unit 26 as described below is used to determine the rotational position of spindle notches 92. The control computer programming moves the table 12 and the spindle 18 so that the plunger 74 is positioned against the spindle 18 in the region 96 of the spindle notches 92. At this point, the table 12 moves in the X direction so that the plunger 74 is depressed in the plunger housing 70 by the region 96 of the spindle 18. The spindle 18 is then rotated slowly at a low torque until the spring loaded plunger 74 extends into one of the spindle notches 92. Further rotation of the spindle 18 is prevented by the plunger 74 resting in the spindle notch 92, as shown in FIGS. 3 and 4. Rotational power to the spindle 18 is shut off after a predetermined amount of time. At this time, a spindle brake may optionally be applied. The spindle 18 is now in the required orientation and is said to be "oriented".

After being oriented by the spindle orientation unit 26, the position of the spindle notches 92 is assumed to be known by the control computer 22. In the initial setup of the tools 20 in the tool changer 10, the tool notches 94 of the tools 20 must be oriented to the plunger 74 as shown in FIG. 5. The tool notches 94 should be parallel to the plunger 74. If the reversed tool-spindle configuration is used, then the dogs of the tool should be parallel to the plunger 74. The initial setup of the tools can be accomplished manually or by using the tool replacement method described later in this document. The program of the control computer 22 then moves the table 12 so that the selected tool 20 residing in the tool changer 10 is directly under the spindle 18. This is accomplished by the combined movement of the table 12 in X and Y directions. Next the spindle 18 is commanded to move downward in the Z direction. The downward movement of the spindle 18 positions the spindle 18 down on top of the tool 20 and downwardly depresses the tool 20 along with the fingers 38 and sandwich plates 40, 42. The sandwich plates 40, 42 are forced downward because of an upper collar 98 usually found on the tool 20. This downward movement continues for either a predetermined distance or until the bottom sandwich plate 42 contacts and triggers the optional switch 50 which then signals the control computer 22.

Next the program of the control computer 22 commands the spindle 18 to engage the tool 20. One common method of engaging the tool 20 and the spindle 18 is the use of a power draw bar screw (not shown). The power draw bar screw is usually a part of the spindle 18 mechanism which rotates and screws into the tool 20 on command, thereby drawing the tool 20 into the spindle 18. As the tool 20 and spindle 18 are engaging, the tool 20 moves upward along with the sandwich plates 40, 42 and fingers 38 and the downward pressure on the tool 20 and tool station 34 is released. The sandwich plates 40,42 and the fingers 38 move upward because the vertical springs 46 push upwards against the bottom sandwich plate 42. If the switch is used, the upward motion of the tool 20 and the sandwich plates 40, 42 allows the switch 50 to rise. The rising of the switch 50 to the full up position or a pre-determined time period for the tool 20 to engage the spindle 18 signals the control computer 22 that the tool 20 has been engaged. Once the tool 20 is engaged by the spindle 18, it is ready to be removed from the fingers 38 and the table 12 is commanded to move away from the spindle 18 in the X direction. The force of the table 12 pulling away forces the front end 66 of the fingers 38 to rotate outward and release the tool 20. Once the tool 20 is released, the fingers 38 rotate back to their original position due to the force of the horizontal spring 44. If the tool 20 does not have a lower collar 99, the tool 20 can be removed from the fingers 38 by the spindle 18 moving upward, thereby pulling the tool 20 from the fingers 38.

During tool 20 replacement into an empty tool station 34, the method is similar but with a slightly different sequence of events. First, the spindle 18 is oriented by the spindle orientation unit 26 as described above, except that the tool 20 is already present in the spindle 18 during the orientation process. The chosen empty tool station 34 is then positioned near or under the now oriented spindle 18 and its tool 20. The tool 20 can be placed in the fingers 38 by a horizontal or vertical method. The horizontal method is when the tool station 34 is near to and aligned in the Y and Z axis with the tool 20 in the spindle 18. The table 12 moves in the X direction toward the spindle 18 and the fingers 38 spread apart as they contact the tool 20. When the tool 20 does not have the lower collar 99, the vertical method can be used. The vertical method is when the tool station 34 is aligned under the tool 20 and the spindle 18 is moved downward until the tool 20 rests in the fingers 38. In both cases the tool 20 and spindle 18 are not lowered enough to fully depress sandwich plates 40, 42, fingers 38 and the switch 50 if used. Next the power draw bar or other mechanism is commanded to disengage or expel the tool 20 from the spindle 18 and this action presses the tool 20 further downward. In the case of the power draw bar screw, the power draw bar screws out of the top of the tool 20 and in so doing the tool 20 is pressed down along with the sandwich plates 40, 42 and the fingers 38, thereby fully depressing switch 50 if used. The depression of the switch 50 or a pre-determined period of time for the tool 20 and spindle 18 to disengage can be used to signal the control computer 22 that the tool 20 is disengaged. Then, the spindle 18 can be moved upward and the tool changer 10 can be moved away by motion of the table 20. Note that the now empty spindle 18 is still oriented correctly to retrieve another tool 20 from any tool station 34 on the tool changer 10.

Figure 2:
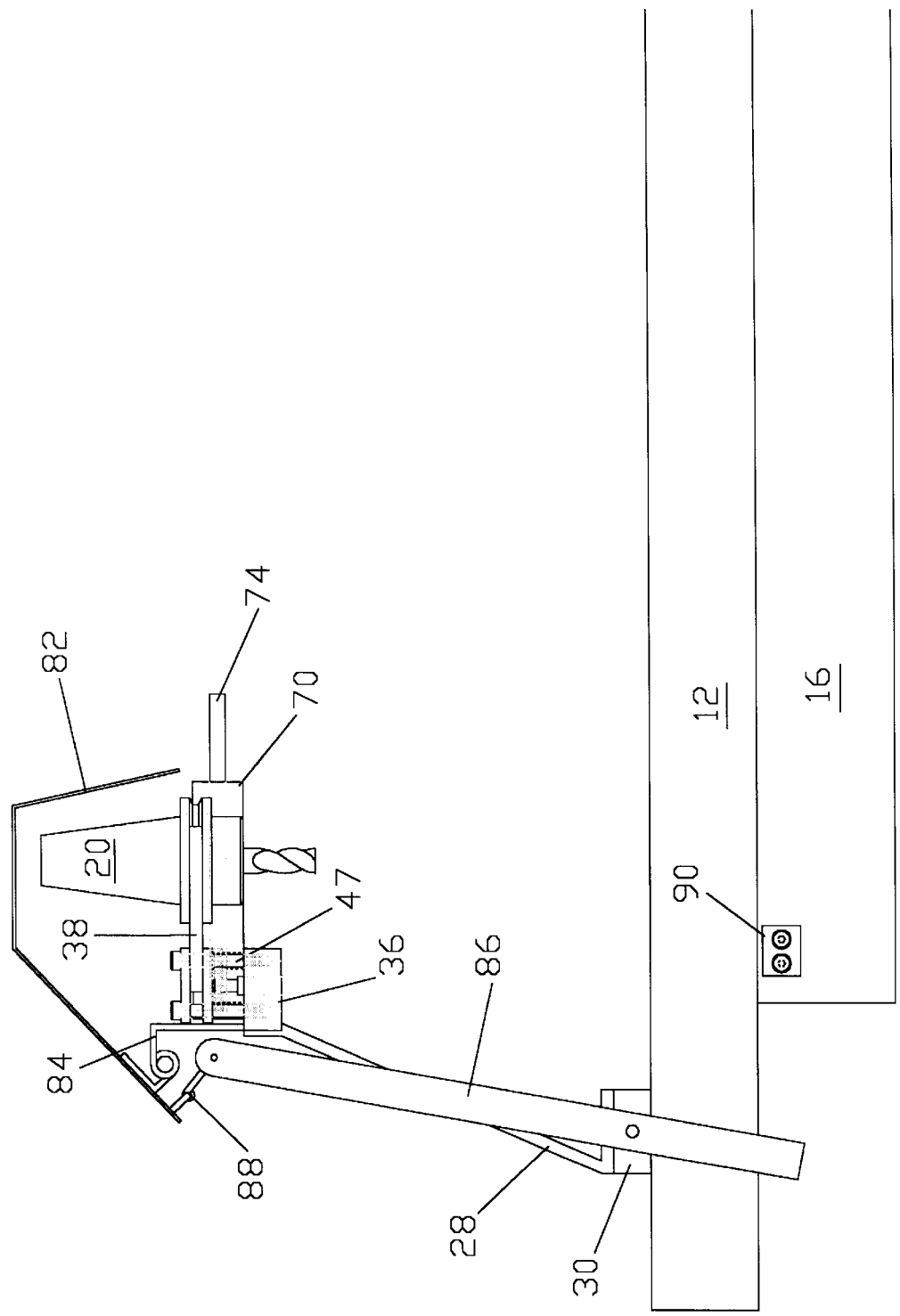
FIG. 2 is a side view of the tool changer of FIG. 1 with a chip cover in a closed position.

The chip cover unit 32 is used to prevent dirt and cutting chips from accumulating on the tools 20 during the machining of material. FIGS. 2 and 3 show the chip cover in the closed and open position respectively. The chip cover 82 is opened by motion of the table 12 in the X direction. No additional motor or actuator is required. As the table 12 moves toward the spindle 18 in the X direction, the bottom 100 of the cover arm 86 hits the activation dog 90 which is mounted on the table base 16. The contact between the cover arm 86 and the activation dog 90 forces the arm 86 to rotate about the pivot point at the changer base 30. This forces the top 102 of the arm 86 to move toward the spindle 18 and pull the cover linkage 88 with it. The movement of the cover linkage 88 rotates the cover 82 about the cover hinge 84 and away from the spindle 18. Once the table 12 moves away from the spindle 18 the reverse action occurs due to the weight of the cover 82, thereby positioning the cover 82 back over the remaining tools 20.

I claim:

1. A tool changer for exchanging tools with a spindle of a machine tool, said spindle comprising a tool holder portion having opposed spindle notches and opposed tool driving portions at a distal end thereof, said tool having driving portions corresponding to said tool driving portions in said spindle, said tool changer comprising:

a tool rack extending from a table of said machine tool;

at least one tool station for receiving said tools, where said tool station is attached as part of said tool rack; and at least one spindle orientation unit adjacent said at least one tool station and attached as part of said tool rack, and spindle orientation unit including a biases movable plunger, said movable plunger compressible by said spindle when an outside surface of said spindle contacts said plunger, one of said spindle and table being movable to position said plunger adjacent said spindle so that said plunger is automatically extendible into one of said notches of said spindle to stop rotation of said spindle, so as to align said spindle to exchange said tools.

2. The tool changer of claim 1, further including:

a changer base; and at least one support extending from said changer base to said tool rack.

3. A tool changer comprising:

a tool rack extending from a table of a machine tool;

at least one spindle orientation unit attached as part of said tool rack; and at least one tool station for receiving a tool, where said tool station is attached as part of said tool rack, said tool station including
a tool station base,
at least two bolts extending from said tool station base,
a bottom plate slidably attached to said two bolts,
two fingers slidably and rotatably attached to said two bolts and above said bottom plate,
at least one vertical spring attached between said tool station base and said plate, and
at least one horizontal spring attached between said two fingers at a rear end of each of said two fingers.

4. The tool changer of claim 3, wherein each finger has a semi-circular side for receiving said tool.

5. The tool changer of claim 3, further including a top plate slidably attached to said bolts and above said fingers.

6. The tool changer of claim 1, wherein said spindle orientation unit comprises a spring loaded plunger extending outward from said tool rack.

7. The tool changer of claim 6, further including a housing on said tool rack to house said plunger, wherein a spring is mounted between a rear wall of said housing and a rear end of said plunger.

8. The tool changer of claim 3, further including a switch extending upward from said tool station base towards said bottom plate to signal that the bottom plate is in a down position.

9. The tool changer of claim 3, further including a chip cover unit, said chip cover unit comprising:

a cover hinge;

a cover connected to said tool rack by said cover hinge;

a cover linkage; and a cover arm connected to said cover by said cover linkage.

10. The tool changer of claim 9, further including an activation dog mounted on the machine tool to engage said cover arm and activate rotation of said cover arm.

* * * * *